(12) United States Patent
Guruswamy (10) Patent No.: US 8,095,983 B2
(45) Date of Patent: *Jan. 10, 2012

(54) PLATFORM FOR ANALYZING THE SECURITY OF COMMUNICATION PROTOCOLS AND CHANNELS

(75) Inventor: Kowsik Guruswamy, Sunnyvale, CA (US)

(73) Assignee: Mu Dynamics, Inc., Sunnyvale, CA (US)

( * ) Notice: Subject to any disclaimer, the term of this patent is extended or adjusted under 35 U.S.C. 154(b) by 1447 days.

This patent is subject to a terminal disclaimer.

(21) Appl. No.: 11/351,403

(22) Filed: Feb. 10, 2006

(65) Prior Publication Data

US 2007/0174917 A1    Jul. 26, 2007

Related U.S. Application Data

(60) Provisional application No. 60/662,430, filed on Mar. 15, 2005.

(51) Int. Cl.
*G06F 21/00* (2006.01)
*G06F 15/16* (2006.01)
*G06F 11/30* (2006.01)

(52) U.S. Cl. .............................. 726/25; 726/23; 709/224

(58) Field of Classification Search .................. 713/201; 726/22–25; 709/221–224
See application file for complete search history.

(56) References Cited

U.S. PATENT DOCUMENTS

| | | |
|---|---|---|
| 5,067,104 A | 11/1991 | Krishnakumar et al. |
| 5,459,837 A | 10/1995 | Caccavale |
| 5,485,409 A | 1/1996 | Gupta et al. |
| 5,892,903 A | 4/1999 | Klaus |
| 6,088,804 A * | 7/2000 | Hill et al. .......................... 726/25 |
| 6,324,656 B1 | 11/2001 | Gleichauf et al. |
| 6,363,477 B1 | 3/2002 | Fletcher et al. |
| 6,574,737 B1 | 6/2003 | Kingsford et al. |
| 6,584,569 B2 | 6/2003 | Reshef et al. |
| 6,609,205 B1 | 8/2003 | Bernhard et al. |
| 6,654,914 B1 | 11/2003 | Kaffine et al. |

(Continued)

FOREIGN PATENT DOCUMENTS

WO    2006/099536    9/2006

OTHER PUBLICATIONS

Bellovin, S., "A Technique for Counting NATted Hosts," Proceedings: Second Internet Measurement Workshop (IMW), Marseille, France, Nov. 6-8, 2002, pp. 267-272.

(Continued)

*Primary Examiner* — Christopher Revak
(74) *Attorney, Agent, or Firm* — K&L Gates LLP (57) ABSTRACT

A security analyzer tests the security of a device by attacking the device and observing the device's response. Attacking the device includes sending one or more messages to the device. A message can be generated by the security analyzer or generated independently of the security analyzer. The security analyzer uses various methods to identify a particular attack that causes a device to fail or otherwise alter its behavior. Monitoring includes analyzing data (other than messages) output from the device in response to an attack. Packet processing analysis includes analyzing one or more messages generated by the device in response to an attack. Instrumentation includes establishing a baseline snapshot of the device's state when it is operating normally and then attacking the device in multiple ways while obtaining snapshots periodically during the attacks.

20 Claims, 2 Drawing Sheets

U.S. PATENT DOCUMENTS

| | | | |
|---|---|---|---|
| 6,952,779 B1* | 10/2005 | Cohen et al. | 726/22 |
| 7,152,105 B2 | 12/2006 | McClure et al. | |
| 7,159,151 B2 | 1/2007 | Morgan et al. | |
| 7,178,166 B1 | 2/2007 | Taylor et al. | |
| 7,185,232 B1 | 2/2007 | Leavy et al. | |
| 7,243,148 B2 | 7/2007 | Keir et al. | |
| 7,257,630 B2 | 8/2007 | Cole et al. | |
| 7,272,650 B2 | 9/2007 | Elgebaly et al. | |
| 7,290,145 B2* | 10/2007 | Falkenthros | 713/182 |
| 7,315,801 B1 | 1/2008 | Dowd et al. | |
| 7,342,892 B2 | 3/2008 | Soon et al. | |
| 7,346,922 B2 | 3/2008 | Miliefsky | |
| 7,421,621 B1* | 9/2008 | Zambrana | 714/38.14 |
| 7,447,966 B2 | 11/2008 | Kamannavar et al. | |
| 7,451,488 B2* | 11/2008 | Cooper et al. | 726/25 |
| 7,471,999 B2 | 12/2008 | Taki | |
| 7,509,675 B2* | 3/2009 | Aaron | 726/22 |
| 7,512,125 B2 | 3/2009 | Betts et al. | |
| 7,536,456 B2 | 5/2009 | Williams et al. | |
| 7,536,605 B2 | 5/2009 | Keaffaber et al. | |
| 7,543,056 B2* | 6/2009 | McClure et al. | 709/224 |
| 7,607,170 B2 | 10/2009 | Chesla | |
| 7,624,422 B2 | 11/2009 | Williams et al. | |
| 7,627,891 B2 | 12/2009 | Williams et al. | |
| 7,627,900 B1 | 12/2009 | Noel et al. | |
| 7,664,845 B2* | 2/2010 | Kurtz et al. | 709/224 |
| 7,673,043 B2* | 3/2010 | Keir et al. | 709/224 |
| 7,774,637 B1* | 8/2010 | Beddoe et al. | 714/38.1 |
| 7,954,161 B1 | 5/2011 | Guruswamy et al. | |
| 7,958,230 B2 | 6/2011 | Guruswamy et al. | |
| 7,958,560 B1 | 6/2011 | Guruswamy | |
| 2001/0034847 A1 | 10/2001 | Gaul, Jr. | |
| 2002/0157041 A1 | 10/2002 | Bennett et al. | |
| 2003/0051163 A1 | 3/2003 | Bidaud | |
| 2003/0154399 A1 | 8/2003 | Zuk et al. | |
| 2003/0159063 A1 | 8/2003 | Apfelbaum et al. | |
| 2004/0001443 A1 | 1/2004 | Soon et al. | |
| 2004/0068586 A1 | 4/2004 | Xie et al. | |
| 2004/0068675 A1 | 4/2004 | Liu | |
| 2004/0103315 A1 | 5/2004 | Cooper et al. | |
| 2004/0205557 A1 | 10/2004 | Bahrs et al. | |
| 2004/0230881 A1 | 11/2004 | Gwak | |
| 2005/0015213 A1 | 1/2005 | Somervill et al. | |
| 2005/0044418 A1 | 2/2005 | Miliefsky | |
| 2005/0135391 A1 | 6/2005 | Sung | |
| 2005/0144137 A1 | 6/2005 | Kumar et al. | |
| 2005/0195820 A1 | 9/2005 | Betts et al. | |
| 2005/0248457 A1* | 11/2005 | Himberger et al. | 340/541 |
| 2005/0273772 A1 | 12/2005 | Matsakis et al. | |
| 2005/0273854 A1 | 12/2005 | Chess et al. | |
| 2005/0273859 A1 | 12/2005 | Chess et al. | |
| 2006/0005231 A1 | 1/2006 | Zuk et al. | |
| 2006/0015941 A1 | 1/2006 | McKenna | |
| 2006/0015943 A1 | 1/2006 | Mahieu | |
| 2006/0021034 A1 | 1/2006 | Cook | |
| 2006/0021044 A1 | 1/2006 | Cook | |
| 2006/0021045 A1 | 1/2006 | Cook | |
| 2006/0021046 A1 | 1/2006 | Cook | |
| 2006/0021047 A1 | 1/2006 | Cook | |
| 2006/0021048 A1 | 1/2006 | Cook et al. | |
| 2006/0021049 A1* | 1/2006 | Cook | 726/25 |
| 2006/0036755 A1 | 2/2006 | Abdullah et al. | |
| 2006/0080733 A1 | 4/2006 | Khosmood et al. | |
| 2006/0085723 A1* | 4/2006 | Bartz et al. | 714/776 |
| 2006/0098579 A1 | 5/2006 | Chang et al. | |
| 2006/0106939 A1 | 5/2006 | Cha et al. | |
| 2006/0137009 A1* | 6/2006 | Chesla | 726/22 |
| 2006/0277606 A1 | 12/2006 | Yunus et al. | |
| 2007/0006037 A1 | 1/2007 | Sargusingh et al. | |
| 2007/0011319 A1 | 1/2007 | McClure et al. | |
| 2007/0086389 A1 | 4/2007 | Park et al. | |
| 2007/0094728 A1* | 4/2007 | Julisch et al. | 726/23 |
| 2007/0115962 A1 | 5/2007 | Mammoliti et al. | |
| 2007/0174917 A1 | 7/2007 | Guruswamy | |
| 2007/0204347 A1 | 8/2007 | Caceres et al. | |
| 2008/0005555 A1 | 1/2008 | Lotem et al. | |
| 2008/0072322 A1 | 3/2008 | Guruswamy | |
| 2008/0092237 A1 | 4/2008 | Yoon et al. | |
| 2008/0098479 A1 | 4/2008 | O'Rourke et al. | |
| 2008/0120283 A1 | 5/2008 | Liu et al. | |
| 2008/0155338 A1* | 6/2008 | Rusmanov | 714/38 |
| 2008/0282352 A1 | 11/2008 | Beddoe et al. | |
| 2009/0083854 A1 | 3/2009 | Bozanich et al. | |
| 2009/0271863 A1 | 10/2009 | Govindavajhala et al. | |
| 2009/0320137 A1* | 12/2009 | White et al. | 726/25 |
| 2009/0328190 A1 | 12/2009 | Liu et al. | |
| 2010/0106742 A1 | 4/2010 | Guruswamy et al. | |
| 2010/0284282 A1 | 11/2010 | Golic | |
| 2010/0284283 A1 | 11/2010 | Golic et al. | |
| 2010/0293415 A1* | 11/2010 | Beddoe et al. | 714/37 |

OTHER PUBLICATIONS

Bradner, S. et al., "Benchmarking Methodology for Network Interconnect Devices (RFC 1944)," May 1996, [online][Retrieved on May 12, 2006] Retrieved from the Internet <URL: http://rfc.net/rfc1944.html>.

Bradner, S. et al., "Benchmarking Methodology for Network Interconnect Devices (RFC 2544)," Mar. 1999, [online] [Retrieved on May 12, 2006] Retrieved from the Internet <URL: http://rfc.net/rfc2544.html>.

Cisco Systems, Inc., "Mobile IP-Nat Detect" in "Cisco IOS IP Mobility Configuration Guide, Release 12.4," 2005, [online] [Retrieved on May 12, 2006] Retrieved from the Internet <URL: http://www.cisco.com/univercd/cc/td/doc/product/software/ios124/124cg/himo_c/ch05/hnatray.pdf>.

Dunn, J. et al., "Methodology for ATM Benchmarking (RFC 3116)," Jun. 2001, [online] [Retrieved on May 12, 2006], Retrieved from the Internet <URL: http://rfc.net/rfc3116.html>.

Egevang, K., et al., "The IP Network Address Translator (NAT) (RFC 1631)," May 1994, [online] [Retrieved on May 12, 2006] Retrieved from the Internet <URL: http://rfc.net/rfc1631.html>.

Microsoft Corp., "Overview of Network Address Translation (NAT) in Windows XP," Sep. 12, 2005, [online] [Retrieved on May 12, 2006] Retrieved from the Internet <URL: http://www.microsoft.com/technet/prodtechnol/winxppro/deploy/nattrnsv.mspx?pf=true>.

Netcom Systems, "SmartWindow User Guide Version 6.53," Document No. 340-1020-001 REV C, Dec. 1999, [online] [Retrieved on May 12, 2006] Retrieved from the Internet <URL: http://cobra.ee.ntu.edu.tw/~oops/HTML6/08_exp/smartbit%20reading.pdf>.

Nikolic, M., "Performance Measurements of Multimedia Transmissions in IP over ATM Networks," Master's Thesis, School of Engineering Science, Simon Fraser University, Dec. 2002, [online] [Retrieved on May 12, 2006] Retrieved from the Internet <URL: http://142.58.111.30/~ljilja/cnl/pdf/milan.pdf>.

Sorensen, S., "Intrusion Detection and Prevention: Protecting Your Network from Attacks," Document No. 200065-002, 2006, [online] [Retrieved on May 12, 2006] Retrieved from the Internet <URL: http://www.juniper.net/solutions/literature/white_papers/200065.pdf>.

Srisuresh, P. et al., "IP Network Address Translator (NAT) Terminology and Considerations (RFC 2663)," Aug. 1999, [online] [Retrieved on May 12, 2006] Retrieved from the Internet <URL: http://rfc.net/rfc2663.html>.

Srisuresh, P. et al., "Traditional IP Network Address Translator (Traditional NAT) (RFC 3022)," Jan. 2001, [online] [Retrieved on May 12, 2006] Retrieved from the Internet <URL: http://rfc.net/rfc3022.html>.

Trend Communications, "RFC 2544 Testing with Aurora Tango," date unknown, [online] [Retrieved on May 12, 2006] Retrieved from the Internet <URL: http://www.trendtest.co.uk/trendweb/resource.nsf/vlFileURLLookup/en%5E%5ERFC+2544+testing/$FILE/GbEnet.25 44.test.pdf>.

Udupa, R. et al., "Performance Issues and Evaluation Techniques for Networking Devices," 2001, [online] [Retrieved on May 12, 2006] Retrieved from the Internet <URL: http://softwaredioxide.com/Channels/events/testing2001/Presentations/raghavendra_infosys.pdf>.

PCT International Search Report and Written Opinion, PCT/US06/09512, Aug. 31, 2006, 7 pages.

Wagner, D. et al., "Intrusion Detection Via Static Analysis," IEEE Symposium on Security and Privacy, 2001, pp. 156-168.

Finlay, I. et al., "Multiple Vulnerabilities in Many Implementations of the Simple Network Management Protocol (SNMP)," CERT® Advisory CA-2002-03, Pittsburgh, PA, US.
Griffin, J.L., "Testing Protocol Implementation Robustness," Published in the Proceedings of 29th Annual International Symposium on Fault-Tolerant Computing (FTC), Jun. 15-18, 1999, Madison, Wisconsin, US.
Kaksonen, R., "A Functional Method for Assessing Protocol Implementation Security," VTT Publications 448, 2001, 128 p.+ app. 15p., Technical Research Centre of Finland, FI.
Kaksonen, R. et al., "Software Security Assessment through Specification Mutations and Fault Injection," Proceedings of the Int'l Federation for Information Processing (IFIP) TC-6/TC-11 Fifth Joint Int'l Working Conference on Communications and Multimedia Security (CMS'01), May 21-22, 2001, Darmstadt, Germany, pp. 173-183.
Miller, B. et al., "Fuzz Revisited: a Re-examination of the Reliability of Unix Utilities and Services," Computer Sciences Department, Oct. 1995, pp. 1-23, Madison, Wisconsin, US.
Protos Test-Suite: c06-snmpv1, University of Oulu (ee.oulu.fi)—http://www.ee.oulu.fi/research/ouspg/protos/testing/c06/snmpv1/index, Oct. 17, 2002, pp. 1-26, Finland.
Protos Test-Suite: c06-ldapv3, University of Oulu (ee.oulu.fi)—http://www.ee.oulu.fi/research/ouspg/protos/testing/c06/ldapv3/index.html, Dec. 2001, pp. 1-13, Finland.
U.S. Appl. No. 11/696,605, filed Apr. 4, 2007.
U.S. Appl. No. 13/153,797, filed Jun. 6, 2011.
U.S. Appl. No. 11/760,600, filed Jun. 8, 2007.
U.S. Appl. No. 13/154,636, filed Jun. 7, 2011.
Wagner, D. et al., "Intrusion Detection Via Static Analysis", IEEE Symposium on Security and Privacy, 2001, pp. 156-168.
Finlay, I. et al., "Multiple Vulnerabilities in Many Implementations of the Simple Network Management Protocol (SNMP)", CERT® Advisory CA-2002-03, Pittsburgh, PA, US.
Griffin, J.L., "Testing Protocol Implementation Robustness", Published in the Proceedings of 29th Annual International Symposium on Fault-Tolerant Computing (FTC), Jun. 15-18, 1999, Madison, Wisconsin, US.
Kaksonen, R., "A Functional Method for Assessing Protocol Implementation Security", VTT Publications 448, 2011, 128 p. + app. 15p., Technical Research Centre of Finland, FI.
Kaksonen, R., "Software Security Assessment through Specification Mutations and Fault Injection", Proceedings of the Int'l Federation for Information Processing (IFIP), TC-6/TC-11 Fifth Joint Int'l Working Conference on Communications and Multimedia Security (CMS'01), May 21-22, 2001, Darmstadt, Germany, pp. 173-183.
Miller, B. et al., "Fuzz Revisited: a Re-examination of the Reliabiltiy of Unix Utilities and Services", Computer Sciences Department, Oct. 1995, pp. 1-23, Madison, Wisconsin, US.
Protos Test-Suite: c06-snmpvl, University of Oulu (ee.oulu.fi)—http://www.ee.oulu.fi/research/ouspg/protos/testing/c06/snmpv1/index, Oct. 17, 2002, pp. 1-26, Finland.
Protos Test-Suite: c06-ldapv3, University of Oulu (ee.oulu.fi)—http://www.ee.oulu.fi/research/ouspg/protos/testing/ c06/ldapv3/index.html, Dec. 2001, p1-13, Finland.
Beddoe, M., "Network Protocol Analysis using Bioinformatics Algorithms", 2004, retrieved on May 17, 2007, from <URL: http://www.4tphi.net/~awalters/PI/pi.pdf>.
Case, J. et al., "A Simple Network Management Protocol (SNMP)" (RFC 1157), May 1990, retrieved on May 17, 2007, from <URL: http://www.faqs.org/rfcs/rfc1157.html>.
Marquis, S., et al., "SCL: a Language for Security Testing of Network Applications", Proceedings: 15th IBM Centre for Advanced Studies Conference (CASCON), Toronto, Canada, Oct. 2005, pp. 155-164, retrieved on May 17, 2007, from <URL: http://post.queensu.ca/~trd/research/papers/marquisSCL.pdf>.
McCloghrie K. et al., "Structure of Management Information Version 2 (SMIv2)" (RFC 2578), Apr. 1999, retrieved on May 17, 2007, from <URL: http://www.faqs.org/rfcs/rfc2578.html>.
Nevill-Manning, C. et al., "Identifying Hierarchical Structure in Sequences: a linear-time algorithm", Journal of Artificial Intelligence Research, vol. 7, Sep. 1997, pp. 67-82, retrieved on May 17, 2007, from <URL: http://arxiv.org/abs/cs/9709102>.
Tal, O. et al., "Syntax-based Vulnerability Testing of Frame-based Network Protocols", Proceedings: 2nd Annual Conference on Privacy, Security and Trust, Fredericton, Canada, Oct. 2004, pp. 155-160, retrieved on May 17, 2007, from <URL: http://post.queensu.ca/~trd/research/papers/FinalPST04.pdf>.
Turcotte, Y. et al., "Security Vulnerabilities Assessment of the X.509 Protocol by Syntax-based Testing", Military Communications Conference (MILCOM), Monterey, CA, Oct. 2004, vol. 3, pp. 1572-1578, retrieved from <URL: http://post.queensu.ca/~trd/research/papers/MILCOM.pdf>.
Zhang, S. et al., "A Lightweight Approach to State Based Security Testing", Proceedings: 16th IBM Centre for Advanced Studies Conference (CASCON), Toronto, Canada, Oct. 2006, Article No. 28, retrieved on May 17, 2007, from <URL: http://post.queensu.ca/~trd/research/papers/zhangState.pdf>.
Zhang, S. et al., "Applying Software Transformation Techniques to Security Testing", Proceedings: Software Technology and Engineering in Practice (STEP), Toronto, Canada, Oct. 2005, retrieved on May 17, 2007, from <URL: http://post.queensu.ca/~trd/research/papers/step2005.pdf>.
Aitel, D., "An Introduction to SPIKE, the Fuzzer Creation Kit" (presentation slides), Aug. 1, 2002, Black Hat USA, Las Vegas, NV, online, retrieved Jun. 26, 2007, from <URL: https://www.blackhat.com/presentations/bh-usa-02/bh-us-02-aitel-spike.ppt>.
Beddoe, M., "Heuristics for Packet Field Identification", Mu Security Research Labs blog, Jan. 4, 2007, online, retrieved Jun. 26, 2007, from <URL: http://labs.musecurity.com/2007/01/04/heuristics-for-packet-field-identification/>.
Beddoe, M., "The Protocol Informatics Project: Automating Network Protocol Analysis" (presentation slides), 2005.
Sonne, B., "Covert Channel detection using Bioinformatics Algorithms", nCircle 360 Security blog, May 11, 2006, online, retrieved on Jun. 26, 2007, from <URL: http://blog.ncircle.com/archives/2006/05/covert_channel_detection_using.html>.
Beizer, B., "Chapter 9: Syntax Testing", in Software Testing Techniques, 2nd Ed., 1990, pp. 284-319, Van Nostrand Reinhold, New York, NY.
Beizer, B., "Chapter 8: Syntax Testing", in Black-Box Testing: Techniques for Functional Testing of Software and Systems, 1995, pp. 177-201, John Wiley & Sons, Inc., New York, NY.
Kaksonen, R. et al., "Vulnerability Analysis of Software through Syntax Testing", 2000, online, retrieved on Sep. 1, 2006, from <URL: http://www.ee.oulu.fi/research/ouspg/protos/analysis/WP2000-robustness/>.
Mu Security, "6 Degrees of Protocols", 2006.
Mu Security, "Protocol Vulnerability Patterns", Apr. 2006.
Rubin, S. et al., "On the Completeness of Attack Mutation Algorithms", 19th IEEE Computer Security Foundations Workshop (CSFW), Jul. 2006, 14 pages, Online, retrieved on Jan. 19, 2010, from <URL: http://pages.cs.wisc.edu/~jha/jha-papers/security/CSFW_2006.pdf>.
Turcotte, Y., "Syntax Testing of Communication Protocols for Security Vulnerabilities (Testing of a subset of the Entrust PKI)", Nov. 2003, online, retrieved on Sep. 1, 2006, from <URL: http://tarpit.rmc.ca/paul/EEE491A%20Fall%202003/Slides/EE491%20GL3%20Syntax%20Testing.ppt>.
Xiao, S. et al., "Integrated TCP/IP Protocol Software Testing for Vulnerability Detection", Proceedings of International Conference on Computer Networks and Mobile Computing (ICCNMC'03), Oct. 20-23, 2003, Shanghai, China, pp. 311-319.
Wikipedia.com, Active Directory, http://en.wikipedia.org/wiki/Tunneling_protocol.
Wikipedia.com, Active Directory, http://en.wikipedia.org/wiki/Session_initiation.
Gordano.com, What is the SMTP/EHLO clause.
U.S. Appl. No. 11/514,809, filed Sep. 1, 2006.
U.S. Appl. No. 11/859,691, filed Sep. 21, 2007.
U.S. Appl. No. 11/351,402, filed Feb. 10, 2006.

* cited by examiner

PLATFORM FOR ANALYZING THE SECURITY OF COMMUNICATION PROTOCOLS AND CHANNELS

REFERENCE TO RELATED APPLICATIONS

This application claims priority from the following provisional application, which is hereby incorporated by reference in its entirety: U.S. Application No. 60/662,430, filed on Mar. 15, 2005, entitled "Automated Robustness and Security Testing of Network Devices". This application is related to the following utility applications, which are hereby incorporated by reference in their entirety: U.S. application Ser. No. 11/351,402, filed on Feb. 10, 2006, entitled "Analyzing the Security of Communication Protocols and Channels for a Pass-Through Device" and U.S. application Ser. No. 11/351,409, filed on Feb. 10, 2006, entitled "Portable Program for Generating Attacks on Communication Protocols and Channels".

BACKGROUND

The present invention relates to automated security analysis of hardware and software.

Computerized communication, whether it occurs at the application level or at the network level, generally involves the exchange of data or messages in a known, structured format (a "protocol"). Software applications and hardware devices that rely on these formats can be vulnerable to various attacks that are generally known as "protocol abuse." Protocol abuse consists of sending messages that are invalid or malformed with respect to a particular protocol ("protocol anomalies") or sending messages that are well-formed but inappropriate based on a system's state. Messages whose purpose is to attack a system are commonly known as malicious network traffic.

Various systems have been developed that identify or detect attacks when they occur. These systems, which are known as intrusion detection systems (IDSs), can be either passive or active. A passive IDS will merely detect an attack, while an active IDS will attempt to thwart the attack. Note that an IDS reacts to an actual attack. While an IDS might be able to detect an attack, it does not change the fact that an attack has occurred and might have damaged the underlying system.

An alternative, proactive solution to the attack problem is to analyze a system ahead of time to discover or identify any vulnerabilities. This way, the vulnerabilities can be addressed before the system is deployed or released to customers. This process, which is known as "security analysis," can be performed using various methodologies. One methodology is to treat the device-under-analysis (DUA) as a black box. Under this methodology, the DUA is analyzed via the interfaces that it presents to the outside world (for example, by sending messages to the DUA). As a result, it is not necessary to access the source code or object code comprising the DUA.

Security analysis requires specific expertise and, thus, is usually performed manually. Also, since the task is vaguely defined, the analysis is usually performed in a haphazard way.

SUMMARY

The present invention overcomes limitations of the prior art by providing a security analyzer for analyzing a security of a device under analysis (DUA). In one embodiment, the security analyzer is an appliance that is capable of executing attacks to test the security of a DUA. An attack can be generated by the security analyzer or generated independently of the security analyzer.

In various applications, the security analyzer sends test messages to the DUA to test a communication protocol of the DUA, a channel of the DUA, and/or an overall security of the DUA. Based on the DUA's response, the security analyzer determines whether a vulnerability has been found.

In one aspect of the invention, the security analyzer is used to identify a particular attack that causes a DUA to fail or otherwise alter its behavior. Two methods can be used to identify a failure or other alteration in behavior: monitoring and packet processing analysis. Monitoring includes analyzing data (other than messages) output from the DUA in response to an attack. Packet processing analysis includes analyzing one or more messages generated by the DUA in response to an attack.

In another aspect of the invention, the security analyzer establishes a baseline snapshot of the DUA's state when it is operating normally and then attacks the DUA in multiple ways while obtaining snapshots periodically during the attacks. In one embodiment, in order to obtain a snapshot ("instrumentation"), the security analyzer sends the DUA a message that is valid with respect to a particular protocol and observes the DUA's response.

In yet another aspect of the invention, the security analyzer maintains a fault log, controls the DUA using a restarter, or sends messages simultaneously to one or more DUAs.

Other aspects of the invention include software, systems, components, and methods corresponding to the above, and applications of the above for purposes other than security analysis.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

As described above, current security analysis techniques have many disadvantages. What is needed is a platform for analyzing the security of a device—a "security analyzer".

In the following description, "device", "device-under-analysis", and "DUA" represent software and/or hardware. Software includes, for example, applications, operating systems, and/or communications systems. Hardware includes, for example, one or more devices. A device can be, for example, a switch, bridge, router (including wireline or wireless), packet filter, firewall (including stateful or deep inspection), Virtual Private Network (VPN) concentrator, Network Address Translation (NAT)-enabled device, proxy (including asymmetric), intrusion detection/prevention system, or network protocol analyzer.

A DUA can also be multiple devices that are communicatively coupled to form a system or network of devices. For example, a DUA can be two firewall devices that establish an encrypted tunnel between themselves.

In one embodiment, a security analyzer tests the communication protocols and/or channels of a device. A "protocol" refers to an exchange of data or messages in a known, structured format. Specifically, a protocol refers to what is being communicated (for example, the data or message content). A security analyzer can test various types of communication protocols, regardless of whether they are public or proprietary. Types of protocols include, for example, networking protocols (including network packets), application program interfaces (APIs; including API calls, remote method invocation (RMI), and remote procedure call (RPC)), and file formats. Appendix A contains exemplary networking protocols, APIs, and file formats.

A protocol generally has three characteristics: structure, semantics, and state. Therefore, when a security analyzer tests a protocol, it tests the protocol's structure, semantics, and/or state. Protocol structure refers to the layout of a message, such as its fields, arguments, or parameters, and its possible length. Protocol semantics refers to the context of a message, such as its actual content and what the content means. Protocol state refers to how the history of previous messages affects later messages. Appendix B contains types of attacks to test a protocol's structure, semantics, and/or state.

A "channel" refers to how protocol data is communicated. Specifically, a channel refers to how a message is delivered to a DUA (for example, using Ethernet on top of a wireless network). One example of a channel attack is sending too many messages at once, thereby flooding a network and resulting in a denial of service (DoS).

In one embodiment, a security analyzer can also test a DUA's overall security. These types of attacks include, for example, negotiating a lower (i.e., less secure) encryption algorithm, dictionary attacks (brute forcing commonly-used passwords), resource exhaustion, identifying misconfiguration of the DUA, identifying mechanisms for sending messages through the DUA that bypass various security checks, and detecting insecure implementations of standard protocols and information disclosure.

In one embodiment, a security analyzer treats a DUA as a black box. Under this methodology, the DUA is analyzed via the interfaces that it presents to the outside world. Analysis includes, for example, "attacking" the DUA by sending one or more messages (test messages) to it and then observing the DUA's response. A response can include, for example, generation of an error or generation of a reply message. Based on the DUA's response, the security analyzer can determine whether a vulnerability has been found.

In one embodiment, the security analyzer is used to identify a particular attack (e.g., one or more test messages) that causes a DUA to fail or otherwise alter its behavior. In one embodiment, an attack is generated independently of the security analyzer and is communicated to the security analyzer so that the security analyzer can test the DUA. For example, a user or other third party generates an attack. In another embodiment, the security analyzer generates an attack automatically. In one embodiment, the security analyzer auto-generates an attack based on a self-describing message format. In one embodiment, the security analyzer generates attacks of unique messages that combine to exhaustively cover the scope of a protocol. Fault isolation, which includes determining which attack caused which response, will be described below.

Identifying a Failure or Other Alteration in Behavior

Figure 1:
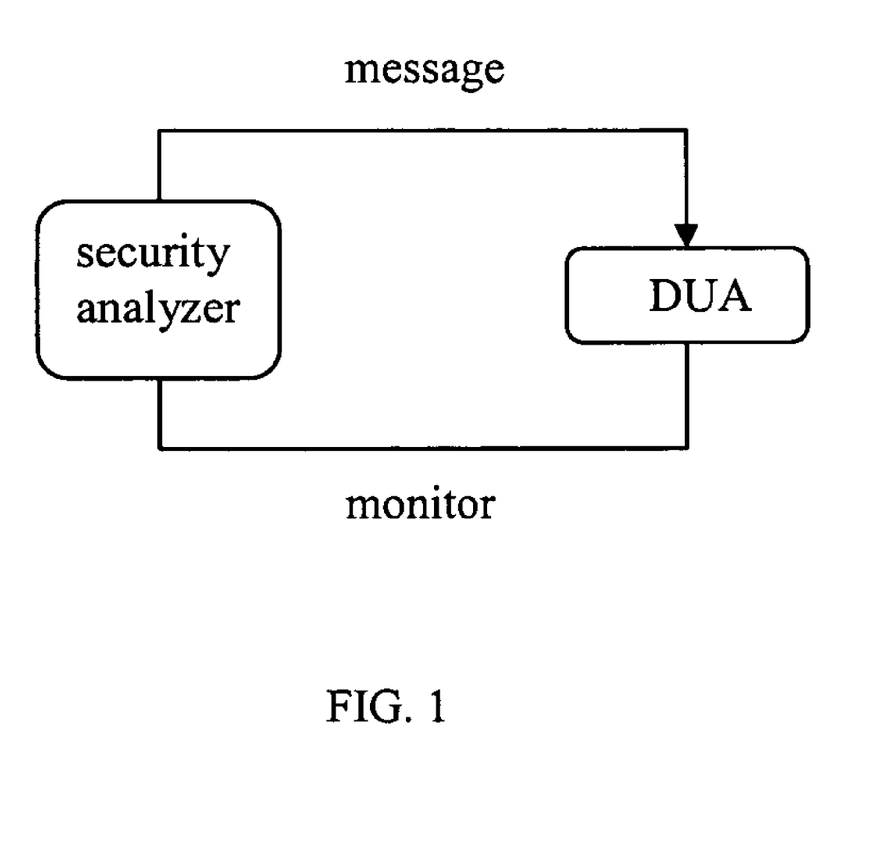
FIG. 1 illustrates a system that includes a security analyzer, a device-under-analysis, a message, and a monitor, according to one embodiment of the invention.

In one embodiment, two methods can be used to identify a failure or other alteration in behavior: monitoring and packet processing analysis. Monitoring includes analyzing data (other than messages) output from the DUA in response to an attack. FIG. 1 illustrates a system that includes a security analyzer, a device-under-analysis, a message, and a monitor, according to one embodiment of the invention. There can also be devices located between the security analyzer and the DUA, although FIG. 1 omits such devices for clarity.

Monitoring can be either passive or active. Passive monitoring includes reviewing information made available by the DUA, while active monitoring includes executing commands on the DUA in order to obtain information. One example of a passive monitor is a console monitor, which monitors console output from the DUA during an attack. In one embodiment, the DUA sends its console output to the security analyzer, which then displays it in real-time in an Analysis Monitor Log. Another example of a passive monitor is a syslog monitor, which monitors syslog output from the DUA during an attack. In one embodiment, the security analyzer acts like a syslog server in order to receive messages from the DUA's syslog client, which are then displayed in real-time in an Analysis Monitor Log.

One example of an active monitor is to connect to the DUA (e.g., using telnet, SNMP, or SSH) and execute a command in order to access various types of information. This information can include, for example, fault messages (such as stack traces and core dumps) and resource use (such as processor utilization, memory usage, or dropped packets). In one embodiment, the DUA executes in debugging mode so that more information is available to the security analyzer.

In one embodiment, a security analyzer includes a monitor pattern feature. A monitor pattern is a regular expression that matches keywords in the header of a fault message. In this embodiment, the security analyzer uses a monitor pattern to identify the beginning of the fault message. In one embodiment, the security analyzer displays all fault messages that are preceded by the specified pattern.

In one embodiment, a security analyzer includes a monitor trace feature. A monitor trace is a record of all the information that was received from a monitor during an analysis. In this embodiment, the security analyzer displays the DUA output (e.g., console messages or syslog messages) during an analysis.

In one embodiment, one DUA includes one or more monitors. In another embodiment, if a DUA includes multiple devices, each of these devices can include zero or more monitors.

Packet processing analysis includes analyzing one or more messages (response messages) generated by the DUA in response to an attack. In one embodiment, when the DUA generates a response message, it sends it to the security analyzer for analysis. Since packet processing analysis requires the DUA to generate a response message, it is generally unsuitable for testing completely passive devices that merely receive messages but do not generate them.

Figure 2:
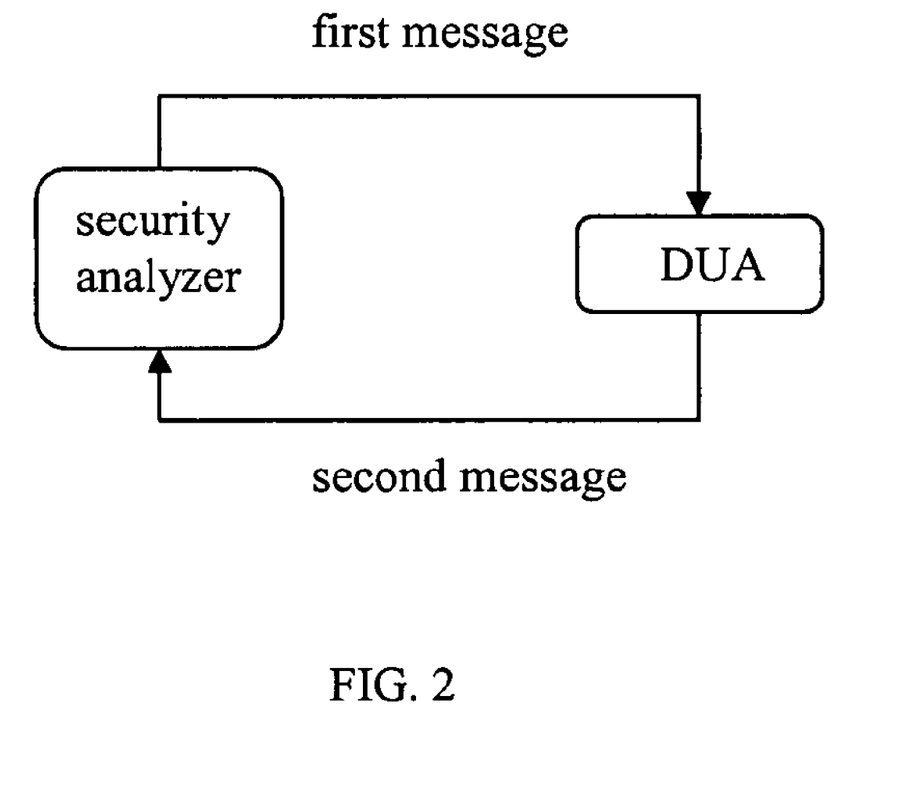
FIG. 2 illustrates a system that includes a security analyzer, a device-under-analysis, a first message, and a second message, according to one embodiment of the invention.

In one embodiment, a security analyzer tests a DUA by sending one or more test messages to the DUA, receiving one or more response messages from the DUA, possibly continuing the message exchange further, and then analyzing the received messages. Specifically, the security analyzer determines whether the DUA operated correctly by considering a pair of messages (or possibly more if a lengthier message exchange is involved), where the first (test) message was sent to the DUA and the second (response) message was generated by the DUA in response to the first message. FIG. 2 illustrates a system that includes a security analyzer, a device-under-analysis, a first message, and a second message, according to one embodiment of the invention. There can also be devices located between the security analyzer and the DUA, although FIG. 2 omits such devices for clarity.

The security analyzer would thus include three components: one component to send a test message to the DUA, one component to receive a response message from the DUA, and one component to analyze whether the DUA operated correctly. If these components exist independently of each other, it is necessary to determine which test message sent by the first component corresponds to which response message received by the second component. If the security analyzer sends only one message at a time, it is relatively easy to determine the correspondence between the sent test message and the received response message.

Depending on the type of DUA, the second response message might be identical to the first test message, similar to the first test message, or radically different from the first test message. For example, if the DUA is a switch, bridge, or router, it might merely relay the first test message without modifying it. If the DUA is an anti-virus gateway, it might modify the first test message by quarantining and removing an attachment that contains a virus. If the DUA is a decryption device, it might generate a decrypted message (the second response message) based on the encrypted message that it received (the first test message).

In one embodiment, a security analyzer acts like a client, a server, or both. In particular, the security analyzer can send a message and receive the same message (after the message has passed through the DUA). In one embodiment, when acting like a client or server, the security analyzer emulates various resources that are typically found in clients or servers, such as directories, files, email messages, databases, user information, and authentication services. For example, the security analyzer can act like both an email client and an email server for POP3 messages. The security analyzer (client) logs on to the security analyzer (server) through the DUA and inquires about the number of emails that are pending on the server. The server then responds with the number of emails and their content.

Fault Isolation and Logging

As described above, in one embodiment, the security analyzer is used to identify a particular attack that causes a DUA to fail or otherwise alter its behavior. This is achieved through fault isolation and instrumentation. In one embodiment, fault isolation includes the following: establishing a baseline snapshot of the DUA's state when it is operating normally; and attacking the DUA in multiple ways while obtaining snapshots periodically during the attacks. In one embodiment, in order to obtain a snapshot ("instrumentation"), the security analyzer sends the DUA a message that is valid with respect to a particular protocol and observes the DUA's response.

When establishing the baseline snapshot, if there is a lack of response or an invalid response from the DUA, this usually indicates that the DUA is misconfigured or does not support the protocol of the message. The baseline snapshot thus serves as a general mechanism to verify the existence and/or capabilities of the DUA.

If all of the later snapshots match the first snapshot, then the DUA is not vulnerable to any of the multiple attacks. If a later snapshot differs, then the DUA is vulnerable to at least one attack that occurred before that differing snapshot but after the last "normal" snapshot (i.e., the last snapshot that still matched the first snapshot).

At this point, in one embodiment, the fault isolation process is repeated, but this time with fewer attacks. For example, only those attacks that occurred after the last normal snapshot but before the differing snapshot are used. Again, the security analyzer obtains snapshots periodically during the attacks. By repeating this process, the security analyzer can focus in on when the successful attack occurred and, eventually, identify the specific attack that affected the DUA (as evidenced by the differing snapshot).

In one embodiment, fault isolation includes multiple passes through the attacks in a coarse-to-fine manner, as follows: The first pass uses a large amount of attacks to determine whether any of them cause the DUA to fail. (If the first pass involves sending multiple concurrent test messages (see below), then an additional pass is used to send them in serial fashion in order to isolate the group of test messages that caused the failure.) The second pass verifies that the failure is reproducible, and a range of test messages is chosen as candidates to cause failure in the DUA. The third pass includes stepping through the range of test messages until the exact test message, if any, is identified.

In one embodiment, the security analyzer maintains a fault log. Messages are logged in various ways and at various levels. Logging can be at the level of a single message, a range of messages, or a group of messages (where a group includes multiple ranges). In one embodiment, messages are logged in as small of a granularity as possible. In another embodiment, messages are grouped logically depending on similarities of their attacks.

When the security analyzer discovers a fault during an analysis, it creates an entry in the fault log. In one embodiment, an entry contains various pieces of information, such as when the fault was discovered, which device exhibited the fault, and which test message (or range or group of messages) caused the fault.

In one embodiment, an entry also includes a confidence metric, which represents the amount of certainty that the attack(s) listed in the entry actually caused the fault. In one embodiment, a confidence metric is determined as follows: If both the snapshot and the monitor indicate a fault, then the confidence metric is High. If the snapshot indicates a fault but no monitor was used, then the confidence metric is Low. If the snapshot indicates a fault but the monitor indicates no fault, then the confidence metric is Medium. If the monitor indicates a fault but the snapshot indicates no fault, then the confidence metric is Medium.

In one embodiment, fault entries and fault logs are stored in a database so that results of previous security analyses can be accessed (for example, in order to prepare a comparative report).

Additional Embodiments

Sometimes a successful attack can cause a DUA to fail catastrophically so that it freezes or crashes. If this happens, the DUA will be unable to process subsequent test messages, even if they are valid. In one embodiment, the security analyzer includes a restarting feature that restores the DUA to its normal operation so that the analysis can continue.

In one embodiment, the restarting feature focuses on the DUA's hardware by power cycling the DUA. For example, the DUA's power cord is plugged into a power relay that is controlled by the security analyzer so that the security analyzer restarts the DUA if the DUA fails or becomes unresponsive during analysis. The power relay can be located either external to the security analyzer or built into it.

In one embodiment, the restarting feature focuses on the DUA's software by shutting down a software application (or constituent process or thread) and restarting it. In another embodiment, the operating system or networking system is shut down and restarted.

In one embodiment, one DUA is controlled by one or more restarters. In another embodiment, if a DUA includes multiple devices, each of these devices can be controlled by zero or more restarters.

In one embodiment, the security analyzer sends several test messages simultaneously (or at least in close proximity to one another). This way, the security analyzer can subject the DUA to several different tests in a shorter period of time. If the security analyzer sends several test messages to and receives several response messages from the DUA, it is more difficult to determine the correspondences between each test message sent to the DUA and each response message generated by the DUA.

In one embodiment, the security analyzer sends and receives messages in such a way that they can be correlated. For example, the messages are correlated based on timestamps or unique identifiers. In another embodiment, the messages are synchronized.

Another way to reduce the analysis time is to test multiple devices in parallel (i.e., simultaneously). If the devices are different, then comparative analysis results can be viewed in real-time as the attacks are sent. If the devices are identical, then a group of attacks can be spread out over the multiple devices. Load balancing these attacks between the identical devices will further reduce the analysis time.

If the security analyzer is testing multiple DUAs, each DUA can have zero or more monitors and zero or more restarters.

A security analyzer can be implemented in hardware, software, or a combination of both. Regarding software, a security analyzer can be, for example, a single application (executing within a single operating system or single physical device) or a pair of applications (one to send test messages and one to receive response messages; executing within the same device and communicating with each other to correlate sent and received messages). Regarding hardware, a security analyzer can be, for example, a pair of physical devices (one to send test messages and one to receive response messages) with out-of-band synchronization to correlate sent and received messages. In one embodiment, the security analyzer is a portable appliance that can be transported to different locations to analyze the security of different devices.

In one embodiment, a security analyzer includes various software tools to help a user analyze a device. These tools can enable the user to perform, for example, reporting, trending, auditing, and comparative metrics on analysis results. The tools can also summarize analysis results or detail specific faults.

In the preceding description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

APPENDIX A

Networking protocols include, for example, Address Resolution Protocol (ARP), Border Gateway Protocol (BGP), Cisco Discovery Protocol (CDP), Dynamic Host Configuration Protocol (DHCP), File Transfer Protocol (FTP), Trivial File Transfer Protocol (TFTP), HyperText Transfer Protocol (HTTP), Internet Control Message Protocol (ICMP), Internet Protocol version 4 (IPv4), Internet Protocol version 6 (IPv6), Internet Security Association and Key Management Protocol (ISAKMP), Light Weight Directory Access Protocol (LDAP), Open Shortest Path First (OSPF), Post Office Protocol 3 (POP3), Remote Authentication Dial-In User Service (RADIUS; including extensions from Cisco Systems, Juniper Networks, and Microsoft), Routing Information Protocol (RIP), Session Initiation Protocol (SIP), Server Message Block (SMB), Remote Administration Protocol (RAP), Simple Mail Transfer Protocol (SMTP), Multipurpose Internet Mail Extension (MIME), Simple Network Management Protocol (SNMP; including SNMP trap), Secure Shell (SSH), Secure Sockets Layer (SSL), Transport Layer Security (TLS), Terminal Access Controller Access Control System Plus (TACACS+), Transmission Control Protocol (TCP), Universal Plug and Play (UPnP), User Datagram Protocol (UDP), and Voice over Internet Protocol (VoIP). Networking protocols also include, for example, any protocol defined by an Internet Engineering Task Force (IETF) Request for Comments (RFC).

Application program interfaces (APIs) include, for example, ActiveX, Common Object Request Broker Architecture (CORBA), Interface Definition Language (IDL), Internet Inter-ORB Protocol (IIOP), Java Remote Method Invocation (Java RMI), Management Information Base (MIB), Server Message Block (SMB), Simple Object Access Protocol (SOAP), and Sun Microsystems Remote Procedure Call (SunRPC; including portmapper and statd).

File formats include, for example, image formats, audio formats, multimedia formats, and text formats. Image file formats include, for example, Graphic Interchange Format (GIF), Joint Photographic Experts Group (JPEG), Microsoft Windows Bitmap (BMP), Portable Document Format (PDF), Portable Network Graphics (PNG), and Tagged Image File Format (TIFF). Audio file formats include, for example, MPEG-1 Audio Layer 3 (MP3; Moving Picture Experts Group), MPEG-2 Part 7 (AAC; Advanced Audio Coding), Microsoft Windows Media Audio (WMA), and RealNetworks RealAudio. Multimedia formats include, for example, Apple QuickTime, Microsoft Windows Media Video (WMfV), and Adobe Flash. Text file formats include, for example, Document Type Definition (DTD), eXtensible Markup Language (XML), X.509 (public key certificates), and Microsoft Word (DOC).

APPENDIX B

Structure attacks are generally based on messages that contain values or parameters that violate an intended protocol. Types of structure attacks include, for example: empty-field, empty-message, extra-data, incomplete, invalid-count, invalid-enum (enumeration), invalid-eol (end-of-line), invalid-field, invalid-index, invalid-length, invalid-offset, invalid-syntax, invalid-type, invalid-utf8 (Unicode Transformation Format), missing-data, missing-field, mixed-case, overflow, repeated-field, too-many-fields, truncated, underflow, and wrong-encoding.

One example of a semantics attack is a message that indicates an invalid (e.g., non-existent) printer instead of a valid printer. This can cause a software application to hang or crash unexpectedly. Another example of a semantics attack is a network packet with a source IP address of "all-broadcast." Responding to this packet would therefore generate enough packets to flood the network. Types of structure attacks include, for example: fmt-string (format), fragmented-field, invalid-encoding, invalid-field, invalid-ip (IP address), invalid-path, invalid-string, recursion, self-reference, and null-char (character).

One example of a state attack is sending messages out-of-order (e.g., with respect to the type of message the DUA is expecting to receive).

What is claimed is:

1. A method for analyzing a security vulnerability of a network device under analysis (DUA) to protocol abuse of a network communication protocol, comprising:
   establishing a baseline snapshot of the DUA's state when the DUA is operating normally, comprising:
      sending to the DUA a message that is valid with respect to the network communication protocol;
      observing the DUA's response to the valid message; and
      establishing the baseline snapshot, the baseline snapshot based at least in part on the observed response of the DUA to the valid message;
   attacking the DUA multiple times, the attacks comprising sending to the DUA test messages that are invalid with respect to the network communication protocol;
   periodically establishing snapshots of the DUA's state during the attacks, based at least in part on observing responses of the DUA to the attacks;
   determining, based on the baseline snapshot and the snapshots established during the attacks, whether the DUA includes a security vulnerability; and
   responsive to a determination that the DUA includes a security vulnerability, using the baseline snapshot and the snapshots established during the attacks to identify which attack causes the security vulnerability.

2. The method of claim 1, wherein establishing the baseline snapshot of the DUA's state further comprises determining, responsive to receiving no response or an invalid response from the DUA for the valid message, that the DUA does not support the network communication protocol.

3. The method of claim 1, wherein establishing the snapshots during the attacks further comprises:
   sending to the DUA the valid message at different times during the attacks of the DUA; and
   establishing snapshots of the DUA based at least in part on a response of the DUA to the sent valid messages.

4. The method of claim 3, wherein establishing snapshots of the DUA based at least in part on the response of the DUA to the sent valid messages further comprises:
   observing a log output of the DUA after sending the valid message;
   executing a command on the DUA to obtain information of the DUA after sending the valid message; and
   establishing the snapshot of the DUA using the log output of the DUA and the information obtained through executing the command on the DUA.

5. The method of claim 4, further comprising:
   determining a probability that the identified attack actually caused the security vulnerability, based both on the log output and on the information obtained through executing the command on the DUA.

6. The method of claim 1, wherein identifying which attack causes the security vulnerability further comprises:
   using the snapshots established during the attacks to identify a subset of the attacks as candidate attacks;
   restarting the DUA, thus restoring the DUA to its normal operation;
   replaying the subset of attacks;
   periodically establishing snapshots of the DUA's state during the replaying of the subset of attacks, the snapshots based at least in part on observing responses of the DUA to the attacks; and
   using the baseline snapshot and the snapshots established during the replaying of the subset of attacks to identify which attack causes the security vulnerability.

7. The method of claim 6, wherein restarting the DUA further comprises power cycling the DUA.

8. A security analyzer device for analyzing a vulnerability of a network device under analysis (DUA) to protocol abuse of a network communications protocol, the security analyzer device comprising:

a computer processor for executing computer program instructions; and a tangible computer-readable storage medium having executable computer program instructions stored thereon, the executable computer program instructions comprising instructions configured to cause the computer processor to perform the steps of:

establishing a baseline snapshot of the DUA's state when the DUA is operating normally, comprising:
sending to the DUA a message that is valid with respect to the network communication protocol;
observing the DUA's response to the valid message; and
establishing the baseline snapshot, the baseline snapshot based at least in part on the observed response of the DUA to the valid message;

attacking the DUA multiple times, the attacks comprising sending to the DUA test messages that are invalid with respect to the network communication protocol;

periodically establishing snapshots of the DUA's state during the attacks, based at least in part on observing responses of the DUA to the attacks;

determining, based on the baseline snapshot and the snapshots established during the attacks, whether the DUA includes a security vulnerability; and responsive to a determination that the DUA includes a security vulnerability, using the baseline snapshot and the snapshots established during the attacks to identify which attack causes the security vulnerability.

9. The security analyzer device of claim 8, wherein establishing the baseline snapshot of the DUA further comprises determining, responsive to receiving no response or an invalid response from the DUA for the valid message, that the DUA does not support the network communication protocol.

10. The security analyzer device of claim 8, wherein establishing the snapshots during the attacks further comprises:
sending to the DUA the valid message at different times during the attacks of the DUA; and
establishing snapshots of the DUA based at least in part on a response of the DUA to the sent valid messages.

11. The security analyzer device of claim 10, wherein establishing snapshots of the DUA based at least in part on the response of the DUA to the sent valid messages further comprises:
observing a log output of the DUA after sending the valid message;
executing a command on the DUA to obtain information of the DUA after sending the valid message; and
establishing the snapshot of the DUA using the log output of the DUA and the information obtained through executing the command on the DUA.

12. The security analyzer device of claim 11, wherein the executable computer program instructions further comprise instructions for performing the step of determining a probability that the identified attack actually caused the security vulnerability, based both on the log output and on the information obtained through executing the command on the DUA.

13. The security analyzer device of claim 8, wherein identifying which attack causes the security vulnerability further comprises:
using the snapshots established during the attacks to identify a subset of the attacks as candidate attacks;
restarting the DUA, thus restoring the DUA to its normal operation;
replaying the subset of attacks;
periodically establishing snapshots of the DUA's state during the replaying of the subset of attacks, the snapshots based at least in part on observing responses of the DUA to the attacks; and
using the baseline snapshot and the snapshots established during the replaying of the subset of attacks to identify which attack causes the security vulnerability.

14. The security analyzer device of claim 13, wherein restarting the DUA further comprises power cycling the DUA.

15. An article of manufacture, the article of manufacture including a computer-readable recording medium having stored thereon executable computer program instructions for analyzing vulnerability of a network device under analysis (DUA) to protocol abuse of a network communication protocol tangibly embodied thereon, the executable computer program instructions comprising instructions for performing the steps of:

establishing a baseline snapshot of the DUA's state when the DUA is operating normally, comprising:
sending to the DUA a message that is valid with respect to the network communication protocol;
observing the DUA's response to the valid message; and
establishing the baseline snapshot, the baseline snapshot based at least in part on the observed response of the DUA to the valid message;

attacking the DUA multiple times, the attacks comprising sending to the DUA test messages that are invalid with respect to the network communication protocol;

periodically establishing snapshots of the DUAs state during the attacks, based at least in part on observing responses of the DUA to the attacks;

determining, based on the baseline snapshot and the snapshots established during the attacks, whether the DUA includes a security vulnerability;

and responsive to a determination that the DUA includes a security vulnerability, using the baseline snapshot and the snapshots established during the attacks to identify which attack causes the security vulnerability.

16. The article of manufacture of claim 15, wherein establishing the baseline snapshot of the DUA further comprises determining, responsive to receiving no response or an invalid response from the DUA for the valid message, that the DUA does not support the network communication protocol.

17. The article of manufacture of claim 15, wherein establishing the snapshots during the attacks further comprises:
sending to the DUA the valid message at different times during the attacks of the DUA; and
establishing snapshots of the DUA based at least in part on a response of the DUA to the sent valid messages.

18. The article of manufacture of claim 17, wherein establishing snapshots of the DUA based at least in part on the response of the DUA to the sent valid messages further comprises:
observing a log output of the DUA after sending the valid message;
executing a command on the DUA to obtain information of the DUA after sending the valid message; and
establishing the snapshot of the DUA using the log output of the DUA and the information obtained through executing the command on the DUA.

19. The article of manufacture of claim 18, wherein the executable computer program instructions further comprise instructions for performing the step of determining a probability that the identified attack actually caused the security vulnerability, based both on the log output and on the information obtained through executing the command on the DUA.

20. The article of manufacture of claim 15, wherein identifying which attack causes the security vulnerability further comprises:
    using the snapshots established during the attacks to identify a subset of the attacks as candidate attacks;
    restarting the DUA, thus restoring the DUA to its normal operation;
    replaying the subset of attacks;
    periodically establishing snapshots of the DUA's state during the replaying of the subset of attacks, the snapshots based at least in part on observing responses of the DUA to the attacks; and
    using the baseline snapshot and the snapshots established during the replaying of the subset of attacks to identify which attack causes the security vulnerability.

* * * * *